(12) United States Patent
Androus

(10) Patent No.: US 10,435,284 B1
(45) Date of Patent: Oct. 8, 2019

(54) LOAD LASER GUIDANCE SYSTEM FOR FORKLIFT

(71) Applicant: Fozi Androus, Brampton (CA)

(72) Inventor: Fozi Androus, Brampton (CA)

( * ) Notice: Subject to any disclaimer, the term of this patent is extended or adjusted under 35 U.S.C. 154(b) by 0 days.

(21) Appl. No.: 15/217,671

(22) Filed: Jul. 22, 2016

(51) Int. Cl.
*B66F 17/00* (2006.01)
*G01G 19/12* (2006.01)

(52) U.S. Cl.
CPC .......... *B66F 17/003* (2013.01); *G01G 19/12* (2013.01)

(58) Field of Classification Search
CPC .......... B66F 9/12; B66F 17/003; B66F 9/075; B66F 9/07568; B66F 9/07563; G01G 19/12
USPC ....... 414/785, 607, 685, 266, 406, 809, 281; 701/50, 22, 23, 26, 37
See application file for complete search history.

(56) References Cited

U.S. PATENT DOCUMENTS

| | | | | |
|---|---|---|---|---|
| 4,279,328 A * | 7/1981 | Ahlbom | ................ | B66F 9/0755 180/169 |
| 6,115,114 A * | 9/2000 | Berg | ................ | G01B 11/00 177/25.15 |
| 6,150,938 A * | 11/2000 | Sower | ................ | B66F 9/0755 250/491.1 |
| 6,220,656 B1 * | 4/2001 | Martin, Jr. | ................ | B60J 7/11 296/190.03 |
| 6,388,748 B1 * | 5/2002 | Kokura | ................ | B66F 9/0755 356/138 |
| 6,411,210 B1 * | 6/2002 | Sower | ................ | B66F 9/0755 250/491.1 |
| 6,713,750 B2 * | 3/2004 | Goddard | ................ | B66F 9/0755 250/221 |
| 7,474,389 B2 * | 1/2009 | Greenberg | ................ | G01B 11/00 356/5.1 |
| 7,865,286 B1 * | 1/2011 | Hall | ................ | B66F 9/125 414/462 |
| 8,103,418 B2 * | 1/2012 | Osswald | ................ | B62D 21/14 187/224 |
| 8,220,169 B2 * | 7/2012 | Goddard | ................ | B66F 9/0755 33/264 |
| 8,585,344 B2 * | 11/2013 | Sharp | ................ | B66F 9/142 187/237 |
| 8,718,372 B2 * | 5/2014 | Holeva | ................ | B66F 9/122 382/181 |
| 9,082,195 B2 * | 7/2015 | Holeva | ................ | B66F 9/122 |
| 9,170,090 B2 * | 10/2015 | Hansen | ................ | B66F 9/0755 |
| 9,358,975 B1 * | 6/2016 | Watts | ................ | B60W 30/04 |

(Continued)

*Primary Examiner* — Courtney D Heinle
*Assistant Examiner* — Luis A Martinez Borrero

(57) ABSTRACT

A load laser guidance system for a forklift having a pair of laterally overlapping and laterally adjustable hollow parallelepiped bars on a forklift front end. A pair of servo motors, provided for the lateral adjustment of the bars, is disposed within the bars, which are attached to the mast assembly by a pair of braces. Forwardly projecting laser sensors, disposed on each bar, are configured to detect a width of a load of palletized cargo and to then communicate with a central processing unit within an interior dashboard which, in turn, activates servo motors to adjust the width of the bars to determine if the cargo can fit within a particular storage space. A dashboard monitor on the dashboard includes controls and a monitor screen permitting manual override of bar width adjustment. Weight sensors, disposed on each forklift arm, recognize load presence prior to activation of the laser sensors.

5 Claims, 4 Drawing Sheets

(56) References Cited

U.S. PATENT DOCUMENTS

| | | | | |
|---|---|---|---|---|
| 9,457,999 B2* | 10/2016 | Belotti | ...................... | B66F 9/12 |
| 9,561,794 B2* | 2/2017 | Watts | .................... | B60W 30/04 |
| 2002/0117607 A1* | 8/2002 | Goddard | ............... | B66F 9/0755 |
| | | | | 250/221 |
| 2009/0260924 A1* | 10/2009 | Rice | .................... | B66F 9/07559 |
| | | | | 187/238 |
| 2012/0060383 A1* | 3/2012 | Goddard | ............... | B66F 9/0755 |
| | | | | 33/228 |
| 2013/0084154 A1* | 4/2013 | Sharp | ...................... | B66F 9/085 |
| | | | | 414/667 |
| 2014/0262550 A1* | 9/2014 | Santi | ...................... | G01G 19/12 |
| | | | | 177/1 |
| 2014/0262625 A1* | 9/2014 | Sharp | ...................... | B66F 9/075 |
| | | | | 187/222 |
| 2014/0318901 A1* | 10/2014 | Philipopoulos | ........... | B66F 9/12 |
| | | | | 187/222 |
| 2015/0368080 A1* | 12/2015 | Dal Dosso | .............. | B66F 9/183 |
| | | | | 701/50 |
| 2016/0116587 A1* | 4/2016 | Miller | .................... | G01S 15/08 |
| | | | | 701/41 |
| 2016/0297655 A1* | 10/2016 | Weiss | .................... | B62B 3/0612 |
| 2017/0108871 A1* | 4/2017 | Watts | .................... | B60W 30/04 |
| 2017/0227629 A1* | 8/2017 | Sorensen | ............. | G01G 19/083 |
| 2017/0285644 A1* | 10/2017 | Ichinose | ................ | G01S 17/08 |

* cited by examiner

LOAD LASER GUIDANCE SYSTEM FOR FORKLIFT

BACKGROUND OF THE INVENTION

Various types of load sensors for the recognition and monitoring of a load on a forklift, as well as a movable load sensor on a forklift devised to vertically adjust the load are known in the prior art. However, what is needed is a load laser guidance system for forklift including a pair of laterally overlapping and laterally adjustable hollow parallelepiped bars disposed on the front end are automatically and laterally adjustable by a pair of servo motors disposed within the pair of bars. The bars are attached to the mast assembly by a pair of braces as well as a pair of forwardly projecting laser sensors disposed on each one of the pair of bars.

FIELD OF THE INVENTION

The present invention relates to load sensors for the recognition and monitoring of a load on a forklift, and more particularly, to a load laser guidance system for forklift which includes a pair of laterally overlapping and laterally adjustable hollow parallelepiped bars disposed on the front end are automatically and laterally adjustable by a pair of servo motors disposed within the pair of bars.

SUMMARY OF THE INVENTION

The general purpose of the present load laser guidance system for forklift, described subsequently in greater detail, is to provide a load laser guidance system for forklift which has many novel features that result in a load laser guidance system for forklift which is not anticipated, rendered obvious, suggested, or even implied by prior art, either alone or in combination thereof.

To accomplish this, the present load laser guidance system for forklift is configured to be disposed on a forklift with a front end, a rear end, an upper side, an interior dash board, a mast assembly disposed on the front end, and a pair of transverse forklift arms on a back side of the mast assembly. A pair of laterally overlapping and laterally adjustable hollow parallelepiped bars, disposed on the front end, is automatically and laterally adjustable by a pair of servo motors disposed within the pair of bars attached to the mast assembly by a pair of braces. A pair of forwardly projecting laser sensors, disposed on each one of the pair of bars, is configured to detect a width of a load of palletized cargo. Once the pair of laser sensors detects the width of the load of palletized cargo, the electrical signal is sent to a central processing unit disposed within the interior dash board. The central processing unit activates the motors which then adjusts the width of the bars and allows an operator to determine if the cargo can fit within a particular storage space. The pair of lasers project in a forward direction so that the operator can also determine the width of the space the cargo would be stored in.

A dashboard monitor is disposed on the interior dashboard and has a plurality of operational controls and a monitor screen which allow the operator to manually override the adjustment of the pair of bars. A plurality of weight sensors, devised to recognize when a load is placed upon the forklift arms, is disposed on an internal edge of each of the pair of forklift arms and is in operation communication with the central processing unit. A parallelepiped plexiglass laser locator is disposed on the upper side and is provided to give the laser beams a bright appearance to the operator to permit the operator to see the laser beams more easily than would be provided without such laser locator.

Thus has been broadly outlined the more important features of the present load laser guidance system for forklift so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
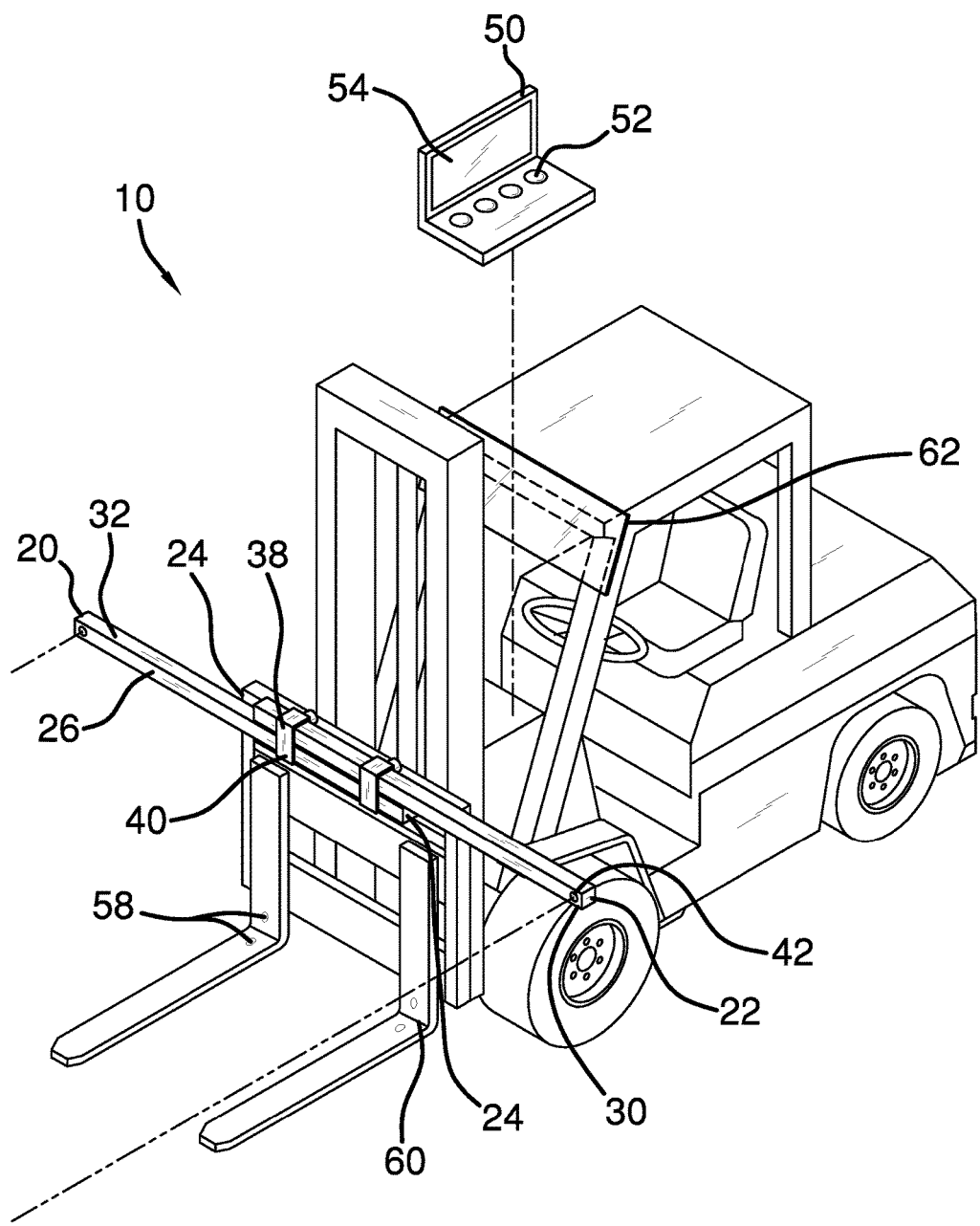
FIG. 1 is a front isometric view.
Figure 2:
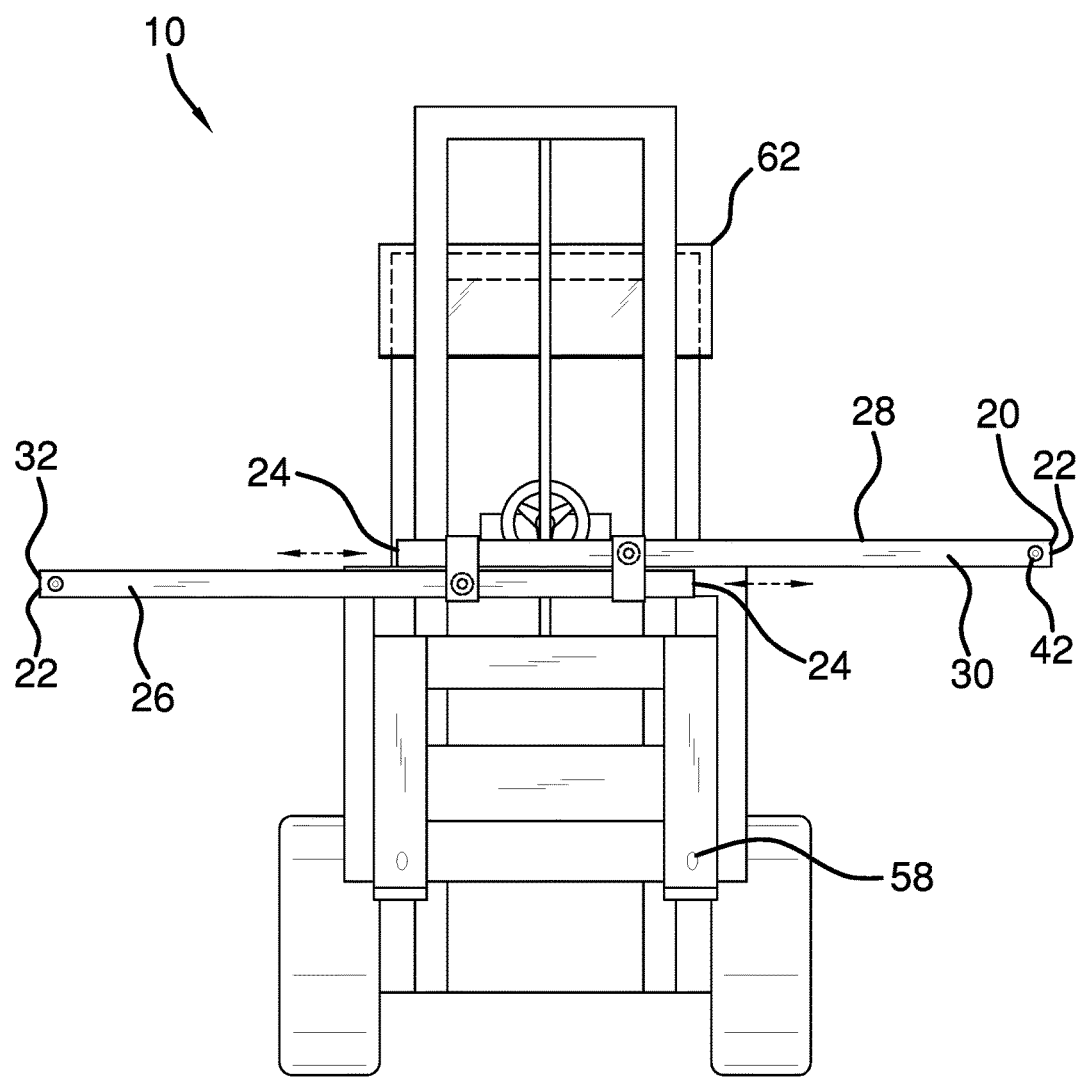
FIG. 2 is a front plan view.
Figure 3:
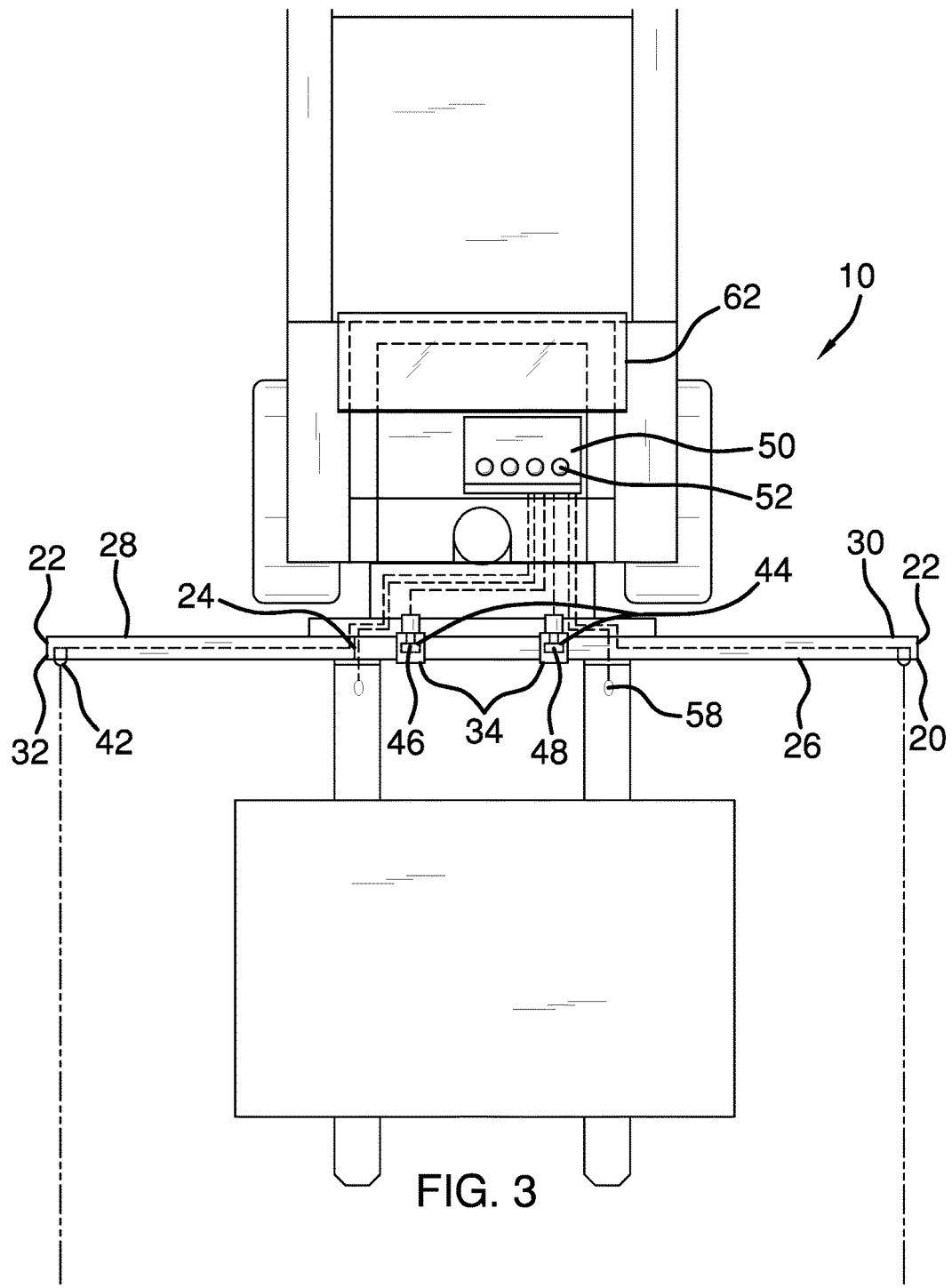
FIG. 3 is a top plan view.
Figure 4:
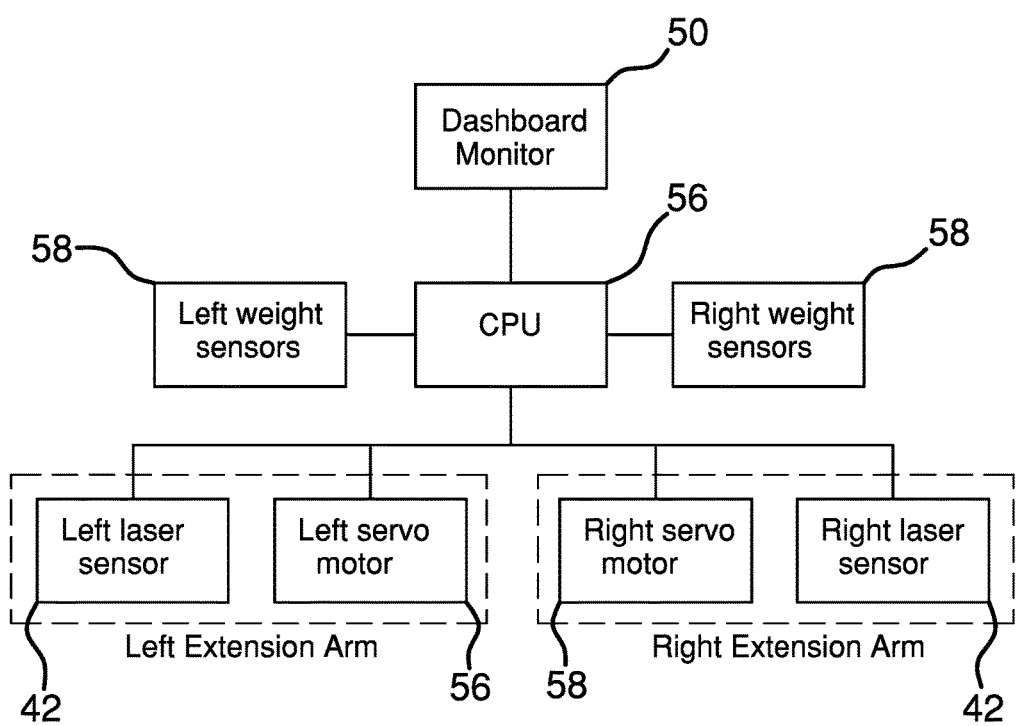
FIG. 4 is a block diagram of operations.

With reference now to the drawings, and in particular FIGS. 1 through 4 thereof, an example of the instant load laser guidance system for forklift employing the principles and concepts of the present load laser guidance system for forklift and generally designated by the reference number 10 will be described.

Referring to FIGS. 1 through 4 the present load laser guidance system for forklift 10 is illustrated. The load laser guidance system for forklift 10 is configured to be disposed on a forklift with a front end, a rear end, an upper side, an interior dash board, a mast assembly disposed on the front end, and a pair of transverse forklift arms on a back side of the mast assembly. The load laser guidance system includes a pair of laterally overlapping and laterally adjustable hollow parallelepiped bars 20 transversely disposed on the front end. Each of the pair of bars 20 has an external end 22, an internal end 24, a front side 26, and a back side 28. The pair of bars 20 comprises a top bar 30 disposed atop a bottom bar 32. A pair of rectangular braces 34 is disposed on a forward side of the mast assembly. Each of the pair of braces 34 has a central opening 36 through which each of the pair of bars 20 is engaged. Each of the pair of braces 34 has an upper end 38 and a lower end 40. A pair of forwardly projecting laser sensors 42 is disposed on the front side 26 proximal the external end 22 of the respective one of the pair of bars 20. The pair of laser sensors 42 is configured to detect a width of a load of palletized cargo.

A pair of servo motors 44 comprises a left servo motor 46 and a right servo motor 48. The left servo motor 46 is statically disposed within the lower end 40 of one of the pair of braces 34 and the bottom bar 32. The right servo motor 48 is statically disposed within the upper end 38 of the other one of the pair of braces 34 and the top bar 30. The servo motors 44 are in operational communication with the laser sensors 42. The left servo motor 46 and the right servo motor 48 are configured to automatically laterally the respective bar with respect to the laser sensor 42 upon activation of the laser sensor 42 and detection of the width of the load of palletized cargo.

A dashboard monitor 50 is disposed on the interior dashboard. The dashboard monitor 50 has a plurality of operational controls 52 and a monitor screen 54. A central processing unit 56 is disposed within the interior dashboard and is in operation communication with the dashboard monitor 50, the pair of servo motors 44, and the pair of laser sensors 42. A plurality of weight sensors 58 is disposed on an internal edge 60 of each of the pair of forklift arms and is in operational communication with the central processing unit 50. The weight sensors 58 are configured to detect a load upon the forklift arms. The laser sensors 42 are activable upon the detection of a load upon the forklift arms by the weight sensors 58. A parallelepiped plexiglass laser locator 62 is disposed on the upper side.

What is claimed is:

1. A load laser guidance system for a forklift, the forklift having a front end, a rear end, an upper side, an interior dash board, a mast assembly disposed on the front end, and a pair of transverse forklift arms on a back side of the mast assembly, the load laser guidance system comprising:
   a pair of laterally overlapping and laterally adjustable hollow parallelepiped bars transversely disposed on the front end, each of the pair of bars having an external end, an internal end, a front side, and a back side, the pair of bars comprising a top bar and a bottom bar, wherein the top bar is disposed atop the bottom bar;
   a pair of rectangular braces disposed on a forward side of the mast assembly, each of the pair of braces having a central opening, each of the pair of bars engaging the central opening of the respective one of the pair of braces, each of the pair of braces having an upper end and a lower end;
   a pair of forwardly projecting laser sensors, wherein each of the pair of laser sensors is disposed on the front side proximal the external end of the respective one of the pair of bars, the pair of laser sensors being configured to detect a width of a load of palletized cargo;
   a pair of servo motors comprising a left servo motor and a right servo motor, the left servo motor being statically disposed within the lower end of one of the pair of braces and the bottom bar, the right servo motor being statically disposed within the upper end of the other one of the pair of braces and the top bar, wherein the servo motors are in operational communication with the laser sensors, wherein the left servo motor is configured to automatically laterally adjust the bottom bar with respect to the laser sensor upon activation of the laser sensor and detection of the width of the load of palletized cargo, wherein the right servo motor is configured to automatically laterally adjust the top bar with respect to the laser sensor upon activation of the laser sensor and detection of the width of the load of palletized cargo;
   a dashboard monitor disposed on the interior dashboard, the dashboard monitor having a plurality of operational controls and a monitor screen;
   a central processing unit disposed within the interior dashboard, wherein the dashboard monitor, the servo motors, and the pair of laser sensors are in operational communication with the central processing unit; and
   a plurality of weight sensors disposed on each of the pair of transverse forklift arms, wherein the plurality of weight sensors is in operational communication with the central processing unit;
   wherein the laser sensors are activable upon detection of the presence of the load by the weight sensors.

2. The load laser guidance system for a forklift of claim 1 wherein the plurality of weight sensors is disposed on an internal edge of each of the pair of forklift arms.

3. The load laser guidance system for a forklift of claim 1 further comprising: a parallelepiped laser locator disposed on the upper side.

4. The load laser guidance system for a forklift of claim 3 wherein the parallelepiped laser locator is plexiglass.

5. A load laser guidance system for a forklift, the forklift having a front end, a rear end, an upper side, an interior dash board, a mast assembly disposed on the front end, and a pair of transverse forklift arms on a back side of the mast assembly, the load laser guidance system comprising:
   a pair of laterally overlapping and laterally adjustable hollow parallelepiped bars transversely disposed on the front end, each of the pair of bars having an external end, an internal end, a front side, and a back side, the pair of bars comprising a top bar and a bottom bar, wherein the top bar is disposed atop the bottom bar;
   a pair of rectangular braces disposed on a forward side of the mast assembly, each of the pair of braces having a central opening, each of the pair of bars engaging the central opening of the respective one of the pair of braces, each of the pair of braces having an upper end and a lower end;
   a pair of forwardly projecting laser sensors, wherein each of the pair of laser sensors is disposed on the front side proximal the external end of the respective one of the pair of bars, the pair of laser sensors being configured to detect a width of a load of palletized cargo;
   a pair of servo motors comprising a left servo motor and a right servo motor, the left servo motor being statically disposed within the lower end of one of the pair of braces and the bottom bar, the right servo motor being statically disposed within the upper end of the other one of the pair of braces and the top bar, wherein the servo motors are in operational communication with the laser sensors, wherein the left servo motor is configured to automatically laterally adjust the bottom bar with respect to the laser sensor upon activation of the laser sensor and detection of the width of the load of palletized cargo, wherein the right servo motor is configured to automatically laterally adjust the top bar with respect to the laser sensor upon activation of the laser sensor and detection of the width of the load of palletized cargo;
   a dashboard monitor disposed on the interior dashboard, the dashboard monitor having a plurality of operational controls and a monitor screen;
   a central processing unit disposed within the interior dashboard, wherein the dashboard monitor, the servo motors, and the pair of laser sensors are in operational communication with the central processing unit;
   a plurality of weight sensors disposed on an internal edge of each of the pair of transverse forklift arms, wherein the plurality of weight sensors is in operational communication with the central processing unit; and
   a parallelepiped plexiglass laser locator disposed on the upper side; wherein the laser sensors are activable upon detection of the presence of the load by the weight sensors.

* * * * *